United States Patent [19]

Anthony et al.

[11] 4,146,679

[45] Mar. 27, 1979

[54] PRIMARY CELL ANODE MATERIAL FORMED FROM ALUMINUM BASE ALLOYS CONTAINING ZINC, MAGNESIUM AND IRON

[75] Inventors: William H. Anthony, Guilford; Andrew J. Brock, Cheshire, both of Conn.

[73] Assignee: Swiss Aluminium Ltd., Chippis, Switzerland

[21] Appl. No.: 846,687

[22] Filed: Oct. 31, 1977

Related U.S. Application Data

[63] Continuation of Ser. No. 705,544, Jul. 15, 1976, abandoned.

[51] Int. Cl.² ........................................... H01M 10/44
[52] U.S. Cl. ........................................ 429/50; 429/218
[58] Field of Search ............... 429/50, 218, 164–174, 429/132–135, 229; 75/138, 146, 147

[56] References Cited

U.S. PATENT DOCUMENTS

| | | | |
|---|---|---|---|
| 2,150,219 | 3/1939 | Grundstrom | 75/146 |
| 2,796,456 | 6/1957 | Stokes, Jr. | 429/166 |
| 3,293,078 | 12/1966 | Frye | 429/218 X |
| 3,513,031 | 5/1970 | Zaromb | 429/218 X |
| 3,765,944 | 10/1973 | Joplin et al. | 429/218 |
| 3,928,075 | 12/1975 | Bass | 429/218 X |

*Primary Examiner*—Charles F. LeFevour
*Attorney, Agent, or Firm*—Robert H. Bachman

[57] ABSTRACT

Primary electric cells are formed using as the combination anode and container for the cell aluminum base alloys containing from 0.2 to 1.0% by weight zinc, up to 5.0% by weight magnesium, less than 0.1% by weight iron, balance aluminum. The aluminum alloys reduce the incidence of hydrogen gas evolution within the cells. The aluminum base alloys may also be utilized as anode material for uses other than primary cells.

8 Claims, 3 Drawing Figures

U.S. Patent    Mar. 27, 1979    4,146,679
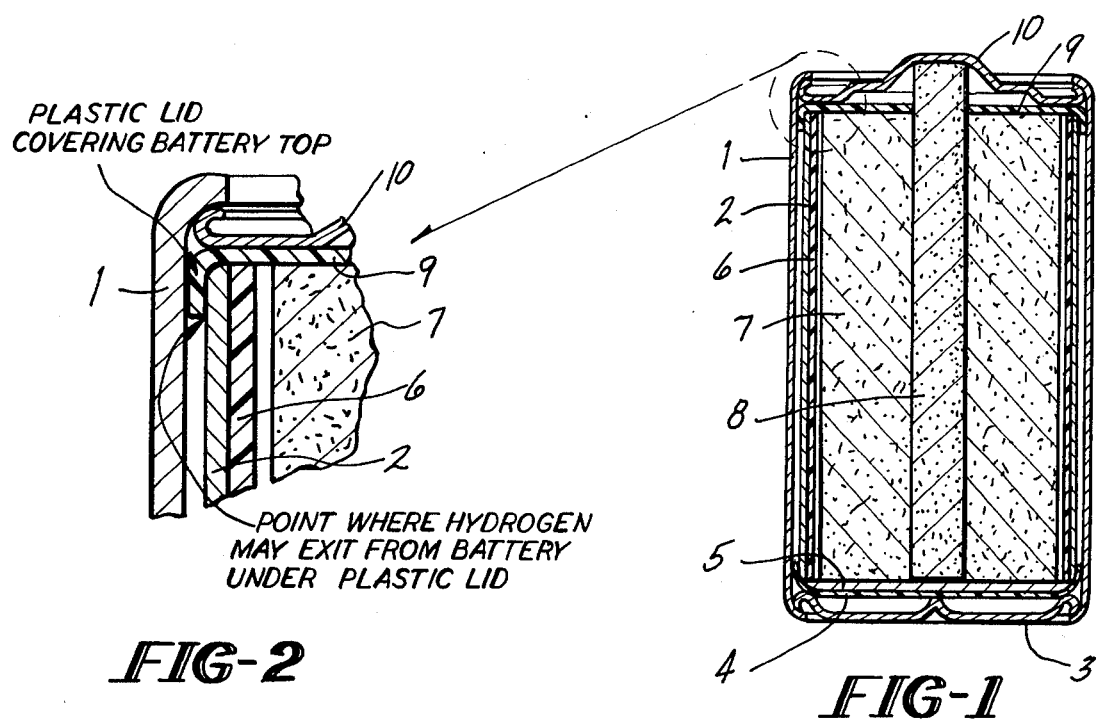
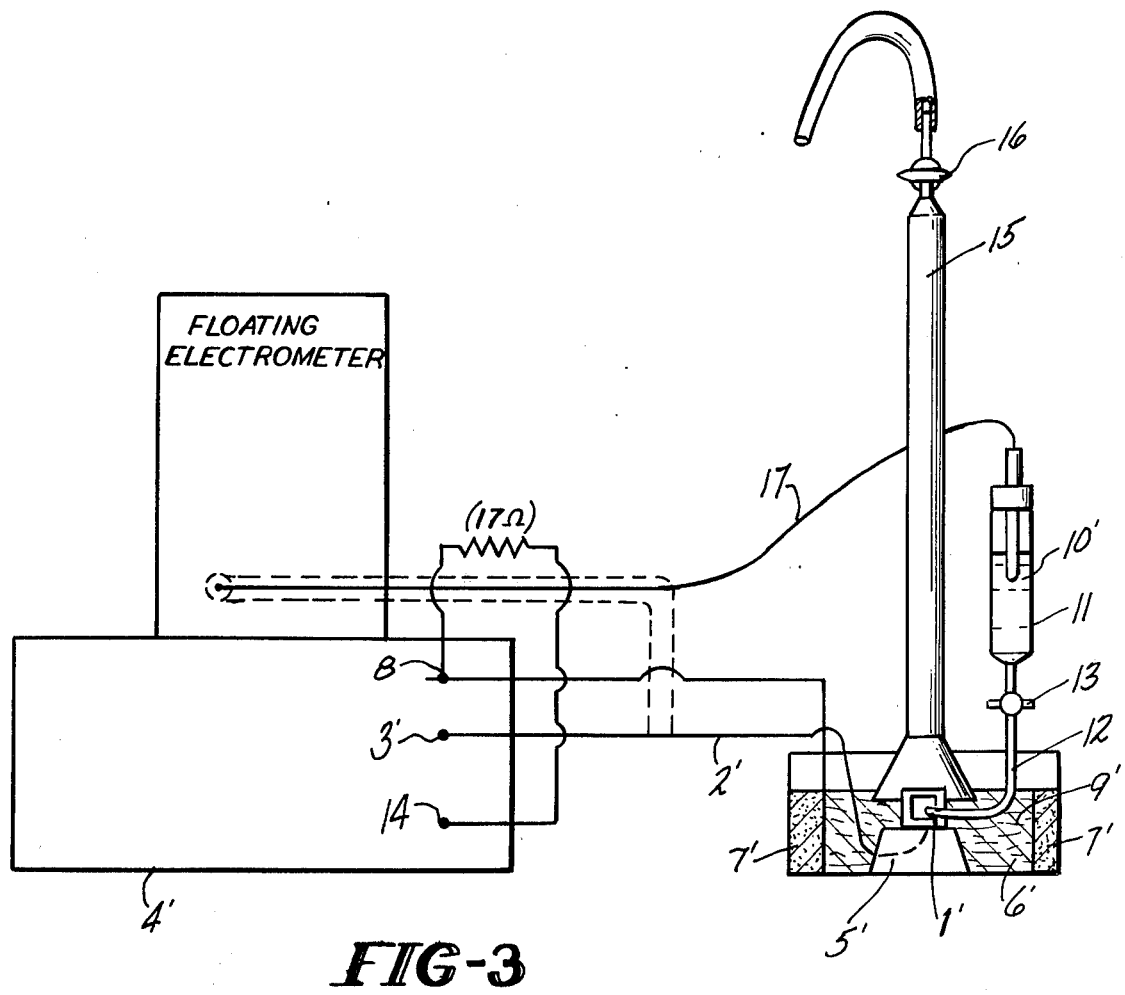

PRIMARY CELL ANODE MATERIAL FORMED FROM ALUMINUM BASE ALLOYS CONTAINING ZINC, MAGNESIUM AND IRON

This is a continuation of application Ser. No. 705,544, filed July 15, 1976, now abandoned.

BACKGROUND OF THE INVENTION

The present invention relates to primary cells of the "dry" type, more particularly to the use of aluminum base alloys as the anode material therein, said anode material also serving as the container for the cell. The present invention also relates to the use of aluminum base alloys as anode material in applications which require resistance to corrosion, such as water heaters.

Zinc is extensively employed as anode material in the construction of dry primary cells, for example, in common flashlight batteries. Numerous proposals have been made to substitute aluminum or aluminum alloys for zinc as the anode material in dry cells in order to utilize the numerous advantageous properties of the aluminum or aluminum alloys. Aluminum and aluminum alloys are generally less expensive than zinc. As zinc becomes more and more scarce, this price differential will increase. Aluminum and aluminum alloys also enjoy a greater ease of fabrication to thin gages and particularly to formed dry cell battery cases.

Dry cell batteries containing aluminum, aluminum-zinc alloys or other aluminum base alloys as the anode material have, however, suffered from numerous significant disadvantages. Such cells generally require the placement of a semi-permeable membrane within the battery container to prevent the evolution of large volumes of hydrogen gas resulting from the aluminum-electrolyte reaction which takes place within the dry cell battery. Dry cell battery containers which have been manufactured from standard commercial aluminum alloys such as Aluminum Association Alloy 1100 are subject to unacceptable hydrogen gas evolution when used. Such hydrogen evolution causes the battery containers to either swell or, in extreme circumstances, to burst. Either condition is not acceptable to the ultimate consumer, since a swollen battery usually cannot be removed from a device into which it has originally been inserted and a battery which has burst may subject the consumer to dangerous corrosive chemicals.

As mentioned above, this evolution of hydrogen gas has presented a problem which has attempted to be solved through the use of a semi-permeable membrane within the battery case which retains the electrolyte material away from the aluminum of the anode casing. Such a solution has not been successful with the typical commercial aluminum alloys. Composite all It is, therefore, an object of the present invention to provide an improved primary cell of the dry type.

It is a further object of the present invention to provide an improved primary cell of the dry type which utilizes an aluminum base alloy as the anode which also serves as the container for the cell.

It is a further object of the present invention to provide a primary cell of the dry type as above which reduces the incidence of hydrogen gas evolution within the cell.

It is an additional object of the present invention to provide anode material formed from an aluminum base alloy which is resistant to corrosion.

Further objects and advantages of the present invention will appear from a consideration of the following discussion.

SUMMARY OF THE INVENTION

In accordance with the present invention, it has now been found that the foregoing objects and advantages may be readily accomplished and corrosion resistant anode material or a primary cell of the dry type obtained, said cell comprising a cathode, preferably a conventional cathodic depolarizer, an electrolyte and an aluminum base alloy container as the anode, said alloy containing from 0.2 to 1.0% by weight of zinc and up to 5.0% by weight of magnesium with less than 0.1% by weight iron, balance aluminum.

The improved aluminum base alloy utilized in the present invention contains preferably less than 0.1% by weight of iron. The iron forms cathodic intermetallic compounds with aluminum which tend to segregate to the grain boundaries of the alloy matrix, at which location it is believed that hydrogen evolution initiates. The iron content of the alloys should, therefore, be as low as possible. Aluminum base alloys containing very much less than 0.1% by weight of iron are, however, impractical from a commercial cost standpoint. On this basis, a limit of 0.1% by weight of iron in the aluminum base alloy of the present invention is considered a good compromise between the cost of the alloy material and the necessary performance characteristics of the formed material.

BRIEF DESCRIPTION OF THE DRAWINGS

FIG. 1 is a diagrammatic view, in section, illustrating a dry cell structure embodying the aluminum base alloys utilized in the present invention.

FIG. 2 is a broken sectional view illustrating the sealing and venting mechanism in the dry cell structure of FIG. 1.

FIG. 3 is a diagrammatic view, partly in section, illustrating the apparatus utilized for measuring hydrogen evolution of the aluminum base alloys utilized in the present invention and comparative alloys during galvanostatic polarization.

DETAILED DESCRIPTION

The aluminum base alloy utilized in the present invention contains from 0.2 to 1.0% by weight zinc and up to 5.0% by weight magnesium with less than 0.1% by weight of iron and the balance aluminum. The optimum zinc concentration in the alloy is approximately 0.5% by weight. The optimum magnesium concentration in the alloy is approximately between 0.5 to 2.0% by weight based upon the dependence of the hydrogen evolution on the magnesium content of aluminum-magnesium binary alloys utilized in examples of the present invention.

High purity aluminum may be employed in the alloys utilized in the present invention. It should be noted, however, that high purity aluminum is much less economical than commercially available aluminum which would generally fulfill the same requirements as would high purity aluminum. Therefore, it is preferred in the instant invention to utilize lower purity aluminum as the base aluminum of the alloy system. This aluminum, as commercially available, generally contains from 0.001 to 0.1% by weight silicon and from 0.001 to 0.1% by weight iron. As noted above, it is critical that the percentage of iron in the alloy system utilized in the present invention remain less than 0.1% by weight of the alloy. The percentage of silicon in the alloy system utilized in the present invention should remain less than 0.1%, preferably less than 0.05% by weight of the alloy. The lower purity aluminum may be substituted for high purity aluminum without detriment to the electrochemical characteristics of the resulting alloy.

It should be understood that the alloys utilized in the present invention may contain, in addition to the elements described above, other impurities normally found in commercially available aluminum. These other materials may also be added to the alloy utilized in the present invention to achieve particularly desirable results. These materials should, however, be limited in amounts which may affect the anodic efficiency of the alloy by forming second phase particulate cathodes and thus promoting localized corrosion of the anode.

Any suitable cathode may be employed in the dry cell of the present invention. For example, the conventional carbon or graphite cathodes may be utilized. These cathodes are usually used with a conventional cathodic depolarizer such as manganese dioxide.

The various electrolytes suggested in the art for use in dry cells may be conveniently used in the primary cell of the present invention. Aluminum chloride is the preferred electrolyte for use in the primary cells utilized in the present invention formed from the aluminum base alloys because of the common aluminum ion. The electrolytes which have been used for zinc primary cells, ammonium chloride and zinc chloride, would be more corrosive in the aluminum cells because of the absence of the common ion.

Referring to FIG. 1, which illustrates an embodiment of the present invention, outer case 1, which forms the covering material for the dry cell, is formed from cardboard or similar material. Directly inside case 1, but spaced therefrom near the top of the cell, is shell 2 formed from the aluminum base alloy utilized in the present invention. Contacting said shell and held in place by said outer case is a metallic formed disc 3, which is in electrical contact with said alloy shell. The base of said shell is covered with a plastic insulating disc 4 and the disc is covered with a shallow polymer coated Kraft paper cup 5. The sidewalls of shell 2 are covered on the side opposite from said case 1 with an ion permeable fibrous separator sheet 6. The polymer coated Kraft paper cup 5 is pressed against the bottom of said separator sheet 6 to prevent migration of cathode mix particles to the aluminum alloy shell 2 at the junction of the plastic insulating disc 4 and the separator sheet 6. The separator sheet covered alloy shell is filled with a conventional cathodic depolarizer 7 such as a mixture of manganese dioxide and acetylene carbon black. A liquid electrolyte is generally added to the depolarizer mixture to activate the dry cell. A carbon rod 8 is inserted in the center of the mixture and forms the cathode current collector for the cell. A plastic disc 9 is placed over the mixture and extends outwardly to the case 1 from carbon rod 8. The dry cell is generally capped with a metallic disc 10 formed so as to cover the cathode collector rod 8 and seal the dry cell at the perimeter of the shell 2 and case 1.

FIG. 2 is an enlarged view of the sealing and spacing arrangement in the dry cell illustrated in FIG. 1. A space is provided between the end portion as shown in FIG. 2 of shell 2 and the end portion as shown in FIG. 2 of case 1 to collect any hydrogen gas which may evolve from the interaction of the electrolyte paste 7 with shell 2 through the porous separator sheet 6. As shown in FIG. 1, this collection space extends from the end of plastic disc 9 to the end of the lower plastic insulating disc 4.

FIG. 3 illustrates the test apparatus utilized to measure the relative hydrogen evolution rates of the aluminum base alloys utilized in the present invention and comparative alloys in a dry battery simulation while in use with electric current being drawn and with the electric current shut off. The apparatus was also used to measure the electrode potential of the aluminum alloy specimen which was a measure of the dry cell voltage which would be available if the alloys were used as a battery can. The specimen 1' consisted of a square piece of the sheet material consisting of the experimental aluminum alloy. An insulated copper lead wire 2' was connected from the specimen 1' to the counter electrode terminal 3' of a potentiostat 4'. The insulated copper lead wire 2' and the edges of the specimen 1' were masked with electrically insulating lacquer, thus leaving exactly ten square centimeters of exposed alloy material.

The specimen 1' was gripped in a groove formed in a rubber stopper 5' placed at the bottom of a glass petri dish 6'. A platinum mesh cathode 7' was inserted in the petri dish so that the mesh surrounded the specimen 1'. This cathode was connected to the reference terminal 8' of the potentiostat 4'. The petri dish was filled with a 12.5% aluminum chloride mixture 9' so that the specimen 1' was submerged 1.5 inches below the mixture surface. Saturated Calomel ($Hg_2Cl_2$) 10' was placed inside a glass separatory funnel 11 which in turn was connected to a capillary tube 12 positioned within one-sixteenth of an inch from the specimen surface. A glass stopper 13, placed between the separatory funnel 11 and the capillary tube 12, was lubricated by means of a slurry of agar mixed with sodium chloride and bentonite which was capable of conducting electricity. A 17 ohm ($\Omega$) resistance was placed between the reference 8' and working 14 terminals of the potentiostat 4'. A gas burette 15 with a glass funnel fused to its bottom portion was placed over the specimen. Air was pumped out of the gas burette until the liquid 9' from the petri dish filled the entire burette. At this point, the stopper 16 on the top portion of the burette was closed. The Calomel shielded electrode lead wire 17 was connected to the positive side of an electrometer equipped with a coaxial lead wire. The grounded shield of this coaxial lead wire was connected to the lead wire 2' between specimen 1' and counter terminal 3'.

EXAMPLE I

A series of aluminum base alloys, whose composition is shown in Table I, were cast as Durville ingots with an aluminum base containing between 0.03 and 0.06% by weight iron and between 0.03 to 0.06% by weight silicon. The ingots were homogenized at 1100° F. (593.3° C.) for 24 hours and then water quenched. The ingots were scalped on both sides to a thickness of 1.5 inches. The slabs were then hot rolled in 20% reduction passes to 0.10 inch gage and subsequently cold rolled to a final gage of 0.018 inch.

TABLE I

| Nominal Compositions Of Experimental Alloys (Balance Essentially Aluminum) | | |
|---|---|---|
| Alloy | % Zinc | % Magnesium |
| A | 0 | 0 |
| B | 0.5 | 0 |

TABLE I-continued

Nominal Compositions Of Experimental Alloys
(Balance Essentially Aluminum)

| Alloy | % Zinc | % Magnesium |
|---|---|---|
| C | 1.0 | 0 |
| D | 5.0 | 0 |
| E | 0.5 | 0.5 |
| F | 1.0 | 0.5 |
| G | 1.5 | 0.5 |
| H | 0 | 1.0 |
| I | 0.3 | 1.0 |
| J | 0.5 | 1.0 |
| K | 0.7 | 1.0 |
| L | 1.0 | 1.0 |
| M | 1.5 | 1.0 |
| N | 0 | 2.5 |
| O | 0.3 | 2.5 |
| P | 0.5 | 2.5 |
| Q | 0.7 | 2.5 |
| R | 1.7 | 2.5 |
| S | 2.5 | 2.5 |
| T | 0 | 5.0 |
| U | 0.5 | 5.0 |
| V | 5.0 | 0 |

EXAMPLE II

The sheet materials described in Example I were degreased and placed one at a time in the apparatus illustrated in FIG. 2. The potentiostat and electrometer of the apparatus were turned on and adjusted so that the current flow through the galvanic cell consisting of the specimen plate, electrolyte and platinum mesh cathode was exactly 100 milliamperes. The hydrogen gas evolved during a three hour period with the galvanic cell on current load and a subsequent one hour period with the current load removed was measured and the results are shown in Table II.

TABLE II

Anode Performance With and Without Current Load

| Alloy | Three Hours With Current On | | One Subsequent Hour With Current Off |
|---|---|---|---|
| | Hydrogen Evolution, cc | Electrode Potential, volts | Hydrogen Evolution, cc |
| A | 27.7 | −0.539 | 1.9 |
| B | 16.9 | −0.587 | 0.4 |
| C | 19.2 | −0.648 | 2.8 |
| D | 29.6 | −0.748 | 6.4 |
| E | 13.9 | −0.595 | 0.2 |
| F | 16.1 | −0.660 | 1.5 |
| G | 24.9 | −0.705 | 3.7 |
| H | 20.0 | −0.522 | 1.3 |
| I | 16.9 | −0.552 | 0.5 |
| J | 13.8 | −0.598 | 0.2 |
| K | 13.5 | −0.610 | 0.3 |
| L | 16.0 | −0.678 | 1.8 |
| M | 27.5 | −0.693 | 4.9 |
| N | 19.5 | −0.521 | 1.4 |
| O | 17.0 | −0.610 | 0.6 |
| P | 14.7 | −0.580 | 0.5 |
| Q | 14.6 | −0.627 | 0.6 |
| R | 26.5 | −0.698 | 5.6 |
| S | 28.5 | −0.728 | 5.8 |
| T | 19.4 | −0.532 | 1.6 |
| U | 14.5 | −0.608 | 0.2 |
| V | 29.6 | −0.748 | 6.4 |

The data indicate that alloys containing between 0.3 and 1.0% by weight zinc and between zero and 5.0% by weight magnesium exhibit hydrogen evolution rates which are lower than the alloys which fall outside the ranges of the present invention. Even though some alloys which fall outside of the ranges of the instant invention exhibit low hydrogen evolution rates, these alloys generally exhibit a lower electrode potential than the alloys of the present invention.

It can be seen from Examples I and II that, even though aluminum-zinc-magnesium alloys are known broadly as Aluminum Association 7XXX series alloys, the restricted range of zinc found necessary in the alloy system utilized in the present invention to achieve low hydrogen evolution rates is not represented by any commercial alloy. The data presented in Examples I and II indicate that the alloy system used in the present invention exhibits a combination of low hydrogen evolution and high electrode potential than do other aluminum-zinc-magnesium alloys outside the invention ranges.

EXAMPLE III

An alloy containing 0.5% by weight zinc and 1.0% by weight magnesium, balance aluminum, was formed into a sacrificial anode for a hot water heater. The performance of this alloy, whose range of elements falls within the range presented by the alloy system utilized in the present invention, was compared to the performance of an anode formed from Aluminum Association Alloy 8020 (0.06% Si max., 0.10% Fe max., 0.16-0.22% Sn, 0.10-0.20% Bi, 0.003-0.01% B, 0.01% Ga min., 0.03% Mg max., 0.004% Ti max., max. of 0.005% for each of Cu, Mg, Cr, Ni and Zn). Both anodes were placed in hot water heaters containing water at a temperature held within 110° F.±50° throughout a two week experiment. The hot water heaters expended approximately 100 gallons of hot water daily throughout the two week test. This amount of hot water is considered normal for an average family. The weight loss of each anode was measured as well as the total coulombic output of each anode and an efficiency for each anode was measured according to the coulombic output for each loss. The results of each anode are shown in Table III.

TABLE III

Coulombic Output Efficiency Comparison of Aluminum Alloy Anodes in Hot Water

| Anode | Weight Loss | | Average Current, ma | Current Density ma/in.$^2$ | Total Coulombic Output amp-secs. | Output amp-hrs/lb. | Theoretical Efficiency % |
|---|---|---|---|---|---|---|---|
| | gms. | lbs. | | | | | |
| AA 8020 | 3.30 | 7.26 × 10$^{-3}$ | 15.8 | 0.21 | 19,112 | 730 | 54 |
| Al-0.5% Zn-1.0% Mg (Nominal) | 0.601 | 1.325 × 10$^{-3}$ | 3.05 | 0.065 | 3,729 | 781.5 | 57.5 |

As can be seen from Table III, the anode of the present invention demonstrates a superior combination of efficiency and resistance to weight loss compared to material normally used for this purpose.

EXAMPLE IV

The anode material containing elements within the ranges utilized in the present invention could not be directly compared to an alloy used commercially as anode material which contains 4.5% by weight zinc, 0.14% by weight tin, 0.11% by weight iron, balance aluminum. Therefore, a comparison was made between AA Alloy 8020 and this commercially available material. Both anodes were subjected to a 48 hour immersion in a 0.1M NaCl solution at 25° C.±2°. As in Example III, the weight loss, total coulombic output and theoretical efficiency based upon output per unit of weight loss were measured for each anode. The results are shown in Table IV.

TABLE IV

Coulombic Output Efficiency Comparison of Aluminum Alloy Anodes in 0.1M NaCl Solution

| Anode | Weight Loss gms | Weight Loss lbs. | Average Current, ma | Current Density ma/in.$^2$ | Total Coulombic Output amp-secs. | Output amp-hrs/lb. | Theoretical Efficiency % |
|---|---|---|---|---|---|---|---|
| AA 8020 | 0.21 | $4.5 \times 10^{-4}$ | 8.60 | 5.60 | 1,496 | 924 | 68 |
| Al-4.5% Zn-0.14% Sn-0.11% Fe | 0.024 | $5.3 \times 10^{-5}$ | 0.62 | 0.40 | 104 | 570 | 42 |

The results shown in Table IV allow an indirect comparison to be made between Al-0.5% Zn-1.0% Mg from Example III and Al-4.5% Zn-0.14% Sn-0.11% Fe from Example IV insofar as theoretical efficiency of each can be determined. As can clearly be seen from Table IV, and a review of Table III, the anode within the ranges of the present invention is even more superior to the commercially available alloy of Example IV than it is to AA Alloy 8020. Therefore, the anodes of the present invention will provide significant protection in even aggressive (i.e., those containing solid or other corrosive materials) waters than commercial anodes presently utilized for the same purpose.

It can be seen from all the examples presented herein that the primary cell anode material and the other anode material of the present invention provides performance which is clearly superior to material presently used for the same purposes.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In a primary electric cell of the dry cell type containing a cathode, an electrolyte, an aluminum base alloy container as the anode for the cell, a separator sheet contacting the interior of said alloy container and an outer casing for said cell, the improvement wherein said anode is an aluminum base alloy consisting essentially of 0.2 to 1.0% by weight zinc, 0.5 to 2.0% by weight magnesium, from 0.001 to 0.1% by weight iron, balance aluminum; and wherein said outer casing is spaced from said aluminum base alloy container in said primary electric cell.

2. A primary electric cell according to claim 1 wherein said primary electric cell contains a manganese dioxide cathodic depolarizer.

3. A primary electric cell according to claim 1 wherein from 0.001 to 0.1% by weight silicon is additionally present in said alloy.

4. A primary electric cell according to claim 1 wherein 0.5% by weight zinc is present in said alloy.

5. In a method for using an aluminum base alloy as the anode container for a primary electric cell of the dry cell type containing a cathode and an electrolyte, said cell being covered by a separator sheet and an outer casing, the improvement wherein said aluminum base alloy consists essentially of 0.2 to 1.0% by weight zinc, 0.5 to 2.0% by weight magnesium, from 0.001 to 1.0% by weight iron, balance aluminum; and wherein said outer casing is spaced from said aluminum base alloy container in said primary electric cell.

6. A method according to claim 5 wherein from 0.001 to 0.1% by weight silicon is additionally present in said alloy.

7. A method according to claim 5 wherein 0.5% by weight zinc is present in said alloy.

8. A method according to claim 5 wherein said primary electric cell contains a manganese dioxide cathodic depolarizer.

* * * * *